(12) United States Patent
Chen et al.

(10) Patent No.: US 10,972,755 B2
(45) Date of Patent: Apr. 6, 2021

(54) METHOD AND SYSTEM OF NAL UNIT HEADER STRUCTURE FOR SIGNALING NEW ELEMENTS

(71) Applicant: MediaTek Singapore Pte. Ltd., Singapore (SG)

(72) Inventors: Lulin Chen, San Jose, CA (US); Chih-Wei Hsu, Hsinchu (TW); Yu-Wen Huang, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/699,272

(22) Filed: Nov. 29, 2019

(65) Prior Publication Data
US 2020/0177923 A1    Jun. 4, 2020

Related U.S. Application Data

(60) Provisional application No. 62/816,292, filed on Mar. 11, 2019, provisional application No. 62/774,901, filed on Dec. 4, 2018, provisional application No. 62/774,351, filed on Dec. 3, 2018.

(51) Int. Cl.
| | | |
|---|---|---|
| *H04N 19/70* | (2014.01) | |
| *H04N 19/503* | (2014.01) | |
| *H04L 29/06* | (2006.01) | |
| *H04N 19/48* | (2014.01) | |
| *H04N 19/196* | (2014.01) | |

(52) U.S. Cl.
CPC .............. *H04N 19/70* (2014.11); *H04L 69/22* (2013.01); *H04N 19/196* (2014.11); *H04N 19/48* (2014.11); *H04N 19/503* (2014.11)

(58) Field of Classification Search
CPC ...... H04N 19/70; H04N 19/503; H04N 19/48; H04N 19/196; H04N 19/68; H04N 19/107; H04N 19/172; H04L 69/22
See application file for complete search history.

(56) References Cited

U.S. PATENT DOCUMENTS

| | | | |
|---|---|---|---|
| 2007/0230564 A1* | 10/2007 | Chen ................ | H04N 21/23432 375/240.01 |
| 2009/0002379 A1* | 1/2009 | Baeza ................ | H04N 19/436 345/522 |
| 2014/0192897 A1* | 7/2014 | Wang ................ | H04N 19/44 375/240.25 |
| 2015/0195577 A1* | 7/2015 | Hannuksela ......... | H04N 19/44 375/240.25 |

FOREIGN PATENT DOCUMENTS

| | | | | |
|---|---|---|---|---|
| WO | WO-2015192989 A1 * | 12/2015 | ............. | H04N 19/44 |

\* cited by examiner

*Primary Examiner* — Tracy Y. Li
(74) *Attorney, Agent, or Firm* — Oblon, McClelland, Maier & Neustadt, L.L.P.

(57) ABSTRACT

A method and apparatus of video coding are disclosed. In the encoding side, video data are received, where a GDR (Gradual Decoding Refresh) picture type is supported by the encoding device. A syntax structure including a first syntax in NAL (Network Access Layer) unit header is generated, where an NAL unit type indicated by the first syntax comprises the GDR picture type. Encoded video data including the syntax structure from the video data are generated. A corresponding method and apparatus for the decoding side are also disclosed.

21 Claims, 1 Drawing Sheet

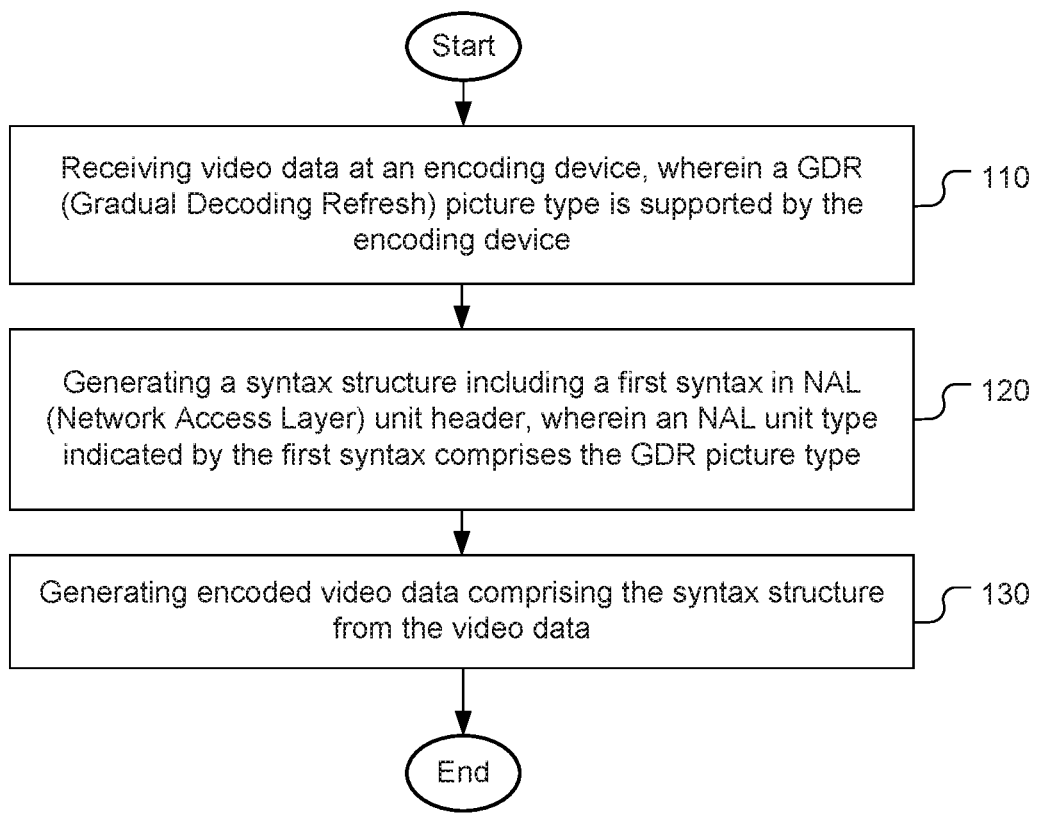

METHOD AND SYSTEM OF NAL UNIT HEADER STRUCTURE FOR SIGNALING NEW ELEMENTS

CROSS REFERENCE TO RELATED APPLICATIONS

The present invention claims priority to U.S. Provisional Patent Application, Ser. No. 62/774,351, filed on Dec. 3, 2018, U.S. Provisional Patent Application, Ser. No. 62/774,901, filed on Dec. 4, 2018 and U.S. Provisional Patent Application, Ser. No. 62/816,292, filed on Mar. 11, 2019. The U.S. Provisional Patent Applications are hereby incorporated by reference in their entireties.

FIELD OF THE INVENTION

The present invention relates to video coding. In particular, the present invention relates to high-level syntax design to indicate picture properties of the video.

BACKGROUND AND RELATED ART

A new Joint Video Experts Team (JVET) between VCEG (Q6/16) and ISO/IEC JTC1 SC29/WG11 (MPEG) was created on 27 Oct. 2017 to develop Versatile Video Codec (VVC), a new video compression standard with capabilities beyond HEVC (ITU-T H.265|ISO/IEC 23008-2). This new generation of video compression technology targets a better compression efficiency and offers more features applicable to various applications including immersive media content.

The working draft (WD) of VVC ("Versatile Video Coding (Draft 3)", in Joint Video Exploration Team (JVET) of ITU-T SG 16 WP 3 and ISO/IEC JTC 1/SC 29/WG 11, 12th Meeting, October 2018, Macau, China, Document: :JVET-L1001) started to specify high level syntax while many other coding tools and core experiments are under evaluation. The NAL (Network Access Layer) unit structures are basically inherited from HEVC. In the WD of VVC, as below, the NAL unit header syntax and NAL unit type codes and NAL unit type classes are in 7.3.1.2 and Table 7-1, respectively.

7.3.1.2 NAL unit header syntax

| nal_unit_header( ) { | Descriptor |
|---|---|
| forbidden_zero_bit | f(1) |
| nal_unit_type | u(5) |
| nuh_temporal_id_plus1 | u(3) |
| nuh_reserved_zero_7bits | u(7) |
| } | |

TABLE 7-1

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice of a non-IRAP picture slice_layer_rbsp( ) | VCL |
| 1 | IRAP_NUT | Coded slice of an TRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

According to 7.3.1.2 NAL unit header syntax in JVET-L1001, the NAL unit header consists of various fields about the NAL unit structure. These fields are packed into 2 bytes (i.e., 16 bits). As shown in the above syntax tables, the NAL Unit Type (NUT), nal_unit_type is signaled in the NAL unit header and various NAL unit types are supported. It is desirable to design new NAL unit header syntax that is more suited to support signaling new elements in the NAL unit structure.

BRIEF SUMMARY OF THE INVENTION

A method and apparatus of video coding are disclosed. In the encoding side, video data are received, where a GDR (Gradual Decoding Refresh) picture type is supported by the encoding device. A syntax structure including a first syntax in NAL (Network Access Layer) unit header is generated, where an NAL unit type indicated by the first syntax comprises the GDR picture type. Encoded video data comprising the syntax structure from the video data are generated.

In one embodiment, the syntax structure further comprises a second syntax to indicate whether NAL unit header field data are present in the syntax structure. If the first syntax indicates the GDR picture type and the second syntax indicates that the NAL unit header field data are present in the syntax structure, GDR related data are signalled in the NAL unit header field data. The GDR related data may comprise a refreshed region flag to indicate whether a coded image area belongs to a refreshed region in a current picture. For example, the coded image area corresponds to a coded tile group. In another example, the coded image area corresponds to a coded slice. The GDR related data may also comprise a GDR picture count syntax to indicate a number of current and subsequent decoded GDR pictures preceding a recovery point in output order. The GDR related data may also comprise a recovery picture count to specify a recovery point of decoded pictures in output order.

In one embodiment, the NAL unit type comprises a DRAP (Dependent Random Access Point) picture type. In one embodiment, the NAL unit type comprises an IRAP (Intra Random Access Point) picture type.

A non-transitory computer-readable medium storing a bitstream is disclosed. The bitstream comprises data in a compressed format corresponding to a plurality of video frames, wherein the data comply with a syntax structure including a first syntax in NAL (Network Access Layer) unit header, wherein an NAL unit type indicated by the first syntax comprises a GDR (Gradual Decoding Refresh) picture type.

BRIEF DESCRIPTION OF THE DRAWINGS

FIG. 1 illustrates an exemplary flowchart for an encoding device incorporating the syntax design according to an embodiment of the present invention, wherein the syntax structure includes a syntax in NAL (Network Access Layer) unit header and an NAL unit type indicated by the first syntax comprises the GDR picture type.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

From system and application point of view, signaling or exposing some properties of coded pictures are desired at a higher syntax level.

In one embodiment of the present invention, the random access properties are added as an additional field in the NAL unit header. The overall NAL unit header use two-step fields with the fixed bit lengths. The NAL unit header field flag in the first 8 bits may indicate whether the next fixed bit field is present. An application may use the signaled information to properly perform the random access processing. The definitions, some are from HEVC, are referenced here followed by the two exemplary designs with the syntax and semantics according to embodiments of the present invention.

Some involved semantics are defined as follows:

intra random access point (IRAP) picture: A coded picture that does not refer to any pictures other than itself for inter prediction in its decoding process.

instantaneous decoding refresh (IDR) picture: An IRAP picture that is the first picture of a codec video sequence (CVS) in decoding order.

non-IRAP picture: A coded picture which is not an IRAP picture.

associated IRAP picture: The previous IRAP picture in decoding order.

leading picture: A non-IRAP picture that precedes the associated IRAP picture in output order.

random access non-reference leading (RANL) picture: A leading picture that is not used as reference pictures for the decoding process of trailing pictures of the same associated IRAP picture.

trailing picture: A non-IRAP picture that follows the associated IRAP picture in output order.

random access: The act of starting the decoding process for a bitstream at a point other than the beginning of the stream.

dependent random access point (DRAP) picture: A trailing picture and it contains no references to pictures other than its associated IRAP picture. Any picture that follows the DRAP picture in both decoding order and output order shall not contain references to any picture that precedes the DRAP picture in decoding order or output order with the exception of the IRAP picture associated with the DRAP picture.

recovery point: A point in the bitstream at which the recovery of an exact or an approximate representation of the decoded pictures represented by the bitstream is achieved after a random access.

gradual decoding refresh (GDR) picture: A non-IRAP picture that contains the refreshed regions relating to the indicated recovery point.

Design Example 1

An exemplary NAL unit header syntax and semantics are shown as follows.

| NAL unit header syntax | |
| --- | --- |
| nal_unit_header( ) { | Descriptor |
| forbidden_zero_bit | f(1) |
| nal_unit_type | u(5) |
| nuh_field_present_flag | f(1) |
| nuh_reserved_zero_1bit | f(1) |
| if(nuh_field_present_flag) | |
| nuh_field_data( ) | u(8) |
| } | |

An exemplary NAL unit header field data are shown as follows.

| NAL unit header field data | |
| --- | --- |
| nuh_field_data( ) { | |
| if(nal_unit_type == IRAP_NUT){ | |
| random_access_type | f(2) |
| num_leading_pic_plus1 | u(4) |
| nuh_reserved_zero_2bits | u(2) |
| } else { | |
| nuh_temporal_id_plus1 | u(3) |
| nuh_reserved_zero_5bits | u(5) |
| } | |
| } | |

In the above example, nal_unit_type specifies the type of RBSP data structure contained in the NAL unit as specified in the following Table 7-1A with the modification on the content of IRAP-NUT.

TABLE 7-1A

| NAL unit type codes and NAL unit type classes | | | |
| --- | --- | --- | --- |
| nal_unit_type | Name of nal_unit_type | Content of NAL unit and RBSP syntax structure | NAL unit type class |
| 0 | NON_IRAP_NUT | Coded slice of a non-IRAP picture slice_layer_rbsp( ) | VCL |
| 1 | IRAP_NUT | Coded slice of an IRAP picture, the first GDR picture of a | VCL |

TABLE 7-1A-continued

NAL unit type codes and NAL unit type classes

| nal_unit_type | Name of nal_unit_type | Content of NAL unit and RBSP syntax structure | NAL unit type class |
|---|---|---|---|
| | | recovery point slice_layer_rbsp( ) | | nuh_field_present_flag equal to 1 specifies that the 8 bits (may be 16 bits as needed) of nuh_field_data is present as the additional part of the NAL unit header. nuh_field_present_flag equal to 0 specifies that the 8 bits (may be 16 bits as needed) of nuh_field_data is not present and specifies, furthermore, when nal_unit_type equal to IRAP_NUT, the content is coded slice of an instantaneous decoding refresh (IDR) picture; when nal_unit_type equal to non-IRAP_NUT, the content is coded slice segment of a dependent random access point (DRAP) picture.

random_access_type specifies the random access type associated with the NAL unit as specified in Table 7-2A.

TABLE 7-2A random_access_type values

| random_access_type values | Name of random access type | Description |
|---|---|---|
| 0 | RAP_TYPE1 | Closed GOP random access point at which a coded picture is an IRAP picture. num_leading_pic_plus1 greater than or equal to 1. |
| 1 | RAP_TYPE2 | Open GOP random access point at which a coded picture is an IRAP picture. num_leading_pic_plus1 greater than 1. |
| 2 | RAP_TYPE3 | Open GOP random access point at which a coded picture is an IRAP picture. num_leading_pic_plus1 greater than 1. The leading pictures are RANL pictures. |
| 3 | RAP_TYPE4 | Gradual Decoding Refresh (GDR) starting point in which a coded picture is the first GDR picture of a recovery point. num_leading_pic_plus1 is greater than 1. |

As shown in the above syntax tables, the NAL Unit Type (NUT), nal_unit_type is signaled in the NAL unit header, including both NON_IRAP and IRAP_NUT types.

Note: RAP_TYPE1 may be used to signal a closed GOP that a seamless random access may be achievable. RAP_TYPE1 may be used to signal an open GOP that random access may cause decoding errors as references to pictures that are not present in the bitstream. RAP_TYPE3 may be used to signal an open GOP that the leading pictures are not used as reference pictures for the decoding process of trailing pictures of the same associated IRAP picture and a random access may be achievable depending on capability of handling the leading pictures in decoding applications.

num_leading_pic_plus1 minus 1, for random_access_type equal to 0, 1 or 2, specifies the number of leading pictures of the associated IRAP picture. For random_access_type equal to 3, num_leading_pic_plus1 minus 1 specifies the number of decoded GDR pictures in output order that precedes the recovery point.

nuh_temporal_id_plus1 minus 1 specifies a temporal identifier for the NAL unit. The value of nuh_temporal_id_plus1 shall not be equal to 0. When nuh_temporal_id_plus1 is not present, it is inferred to be equal to 1 (e.g. it is inferred to be 1 for IDR pictures and DRAP pictures).

As shown in the above tables for NAL unit header and NAL unit header field data, the syntax design supports random access picture and syntax nuh_field_present_flag is included in the NAL unit header. If nuh_field_present_flag is true, nuh_field_data( ) (i.e., NAL unit header field data) is signaled subsequently.

Design Example 2

An exemplary NAL unit header syntax and semantics are shown as follows:

| NAL unit header syntax | |
|---|---|
| nal_unit_header( ) { | Descriptor |
|   forbidden_zero_bit | f(1) |
|   nal_unit_type | u(5) |
|   nuh_field_present_flag | f(1) |
|   nuh_reserved_zero_1bit | f(1) |
|   if(nuh_field_present_flag) | |
|     nuh_field_data( ) | u(8) |
| } | |

An exemplary NAL unit header field data are shown as follows.

| | |
|---|---|
| nuh_field_data( ) { | |
|   if(nal_unit_type == IRAP_NUT){ | |
|     random_access_type | f(2) |
|     num_leading_pic_plus1 | u(3) |
|     nuh_reserved_zero_3bits | u(3) |
|   } else if(nal_unit_type == GDR_NUT){ | |
|     refreshed_region_flag | f(1) |
|     gdr_pic_count | u(4) |
|     nuh_reserved_zero_3bits | u(3) |
|   } else { | |
|     nuh_temporal_id_plus1 | u(3) |
|     nuh_reserved_zero_5bits | u(5) |
|   } | |
| } | |

In the above example, nal_unit_type specifies the type of RBSP data structure contained in the NAL unit as specified in the following modified Table 7-1B with the added nal_unit_type equal to 2 for GDR_NUT.

TABLE 7-1B

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice of a non-IRAP picture slice_layer_rbsp( ) | VCL |
| 1 | IRAP_NUT | Coded slice of an IRAP picture slice_layer_rbsp( ) | VCL |

TABLE 7-1B-continued

NAL unit type codes and NAL unit type classes

| nal_unit_type | Name of nal_unit_type | Content of NAL unit and RBSP syntax structure | NAL unit type class |
|---|---|---|---|
| 2 | GDR_NUT | Coded slice of a GDR picture slice_layer_rbsp( ) | VCL | nuh_field_present_flag equal to 1 specifies that the 8 bits (may be 16 bits as needed) of nuh_field_data is present as the additional part of the NAL unit header. nuh_field_present_flag equal to 0 specifies that the 8 bits (may be 16 bits as needed) of nuh_field_data is not present and specifies, furtherly, when nal_unit_type equal to IRAP_NUT, the content is coded slice segment of an instantaneous decoding refresh (IDR) picture; when nal_unit_type equal to non-IRAP_NUT, the content is coded slice segment of a dependent random access point (DRAP) picture.

random_access_type specifies the random access type associated with the NAL unit as specified in the following modified Table 7-2B.

TABLE 7-2B random_access_type values

| random_access_type values | Name of random access type | Description |
|---|---|---|
| 0 | RAP_TYPE1 | Closed GOP random access point at which a coded picture is an IRAP picture with num_leading_pic_plus1 greater than or equal to 1. |
| 1 | RAP_TYPE2 | Open GOP random access point at which a coded picture is an IRAP picture with num_leading_pic_plus1 greater than 1. |
| 2 | RAP_TYPE3 | Open GOP random access point at which a coded picture is an IRAP picture with num_leading_pic_plus1 greater than 1. The leading pictures are RANL pictures. |
| 3 | | reserved |

Note:
RAP_TYPE1 may be used to signal a closed GOP that a seamless random access may be achievable. RAP_TYPE1 may be used to signal an open GOP that random access may cause decoding errors as references to pictures that are not present in the bitstream. RAP_TYPE3 may be used to signal an open GOP that the leading pictures are not used as reference pictures for the decoding process of trailing pictures of the same associated IRAP picture and a random access may be achievable depending on capability of handling the leading pictures in decoding applications.

num_leading_pic_plus1 minus 1, for random_access_type equal to 0, 1 or 2, specifies the number of leading pictures of the associated IRAP picture.

refreshed_region_flag equal to 1 indicates that the slice belong to the refreshed region in the current picture. refreshed_region_flag equal to 0 indicates that the slice may not belong to the refreshed region in the current picture.

gdr_pic_count indicates the number of current and subsequent decoded GDR pictures in output order that precedes the recovery point. gdr_pic_count is a counter and it shall be 1 for the last decoded GDR pictures in output order that precedes the recovery point.

nuh_temporal_id_plus1 minus 1 specifies a temporal identifier for the NAL unit. The value of nuh_temporal_id_plus1 shall not be equal to 0. When nuh_temporal_id_plus1 is not present, it is inferred to be equal to 1 (e.g. it is inferred to be 1 for IDR pictures and DRAP pictures).

As some embodiments, those reserved zero bits such as nuh_reserved_zero_3 bits may be specified for addition information, e.g. refreshed_region_flag, exact_match_flag and broken_link_flag as in HEVC.

As shown in the above tables for NAL unit header and NAL unit header field data, the syntax design supports random access picture and GDR picture, IRAP and NON_I-RAP pictures for coded slices. Furthermore, syntax nuh_field_present_flag is included in the NAL unit header. If nuh_field_present_flag is true, nuh_field_data( ) (i.e., NAL unit header field data) is signaled subsequently.

According to another embodiment of the present invention, the random access properties are added as an additional field in the NAL unit header. The overall NAL unit header are a fixed two 8-bit field. Some elements in the filed may be ignored in terms of the NAL unit type.

Design Example 3

An exemplary NAL unit header syntax and semantics are shown as follows.

| NAL unit header syntax | |
|---|---|
| nal_unit_header( ) { | Descriptor |
|   forbidden_zero_bit | f(1) |
|   nal_unit_type | u(5) |
|   end_nuh_field_flag | f(1) |
|   if(nal_unit_type == IRAP_NUT){ | |
|     random_access_type | f(2) |
|     num_leading_pic_plus1 | u(4) |
|     nuh_reserved_zero_3bits | u(3) |
|   } else { | |
|     nuh_temporal_id_plus1 | u(3) |
|     nuh_reserved_zero_6bits | u(6) |
|   } | |
| } | |

In the above example, forbidden_zero_bit shall be equal to 0. nal_unit_type specifies the type of RBSP data structure contained in the NAL unit as specified in the following modified Table 7-1C with the modification on the content of IRAP-NUT.

TABLE 7-1C

NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice of a non-IRAP picture slice_layer_rbsp( ) | VCL |
| 1 | IRAP_NUT | Coded slice of an IRAP picture, the first GDR picture of a recovery point slice_layer_rbsp( ) | VCL |

In the above exemplary syntax design, end_nuh_field_flag equal to 1 specifies that the subsequent bits shall be ignored, when nal_unit_type equal to IRAP_NUT, the content is coded slice of an instantaneous decoding refresh (IDR) picture; when nal_unit_type equal to non-IRAP_NUT, the content is coded slice segment of a dependent random access point (DRAP) picture. end_nuh_field_flag equal to 0 specifies that the subsequent bits shall be used for the NAL unit type.

random_access_type specifies the random access type associated with the NAL unit as specified in the following modified Table 7-2C.

TABLE 7-2C random_access_type_values

| random_access_type values | Name of random access type | Description |
|---|---|---|
| 0 | RAP_TYPE1 | Closed GOP random access point at which a coded picture is an IRAP picture. num_leading_pic_plus1 greater than or equal to 1. |
| 1 | RAP_TYPE2 | Open GOP random access point at which a coded picture is an IRAP picture. num_leading_pic_plus1 greater than 1. |
| 2 | RAP_TYPE3 | Open GOP random access point at which a coded picture is an IRAP picture. num_leading_pic_plus1 greater than 1. The leading pictures are RANL pictures. |
| 3 | RAP_TYPE4 | Gradual Decoding Refresh (GDR) starting point in which a coded picture is the first GDR picture of a recovery point. num_leading_pic_plus1 is greater than 1. |

Note:
RAP_TYPE1 may be used to signal a closed GOP that a seamless random access may be achievable. RAP_TYPE1 may be used to signal an open GOP that random access may cause decoding errors as references to pictures that are not present in the bitstream. RAP_TYPE3 may be used to signal an open GOP that the leading pictures are not used as reference pictures for the decoding process of trailing pictures of the same associated IRAP picture and a random access may be achievable depending on capability of handling the leading pictures in decoding applications.

In the above syntax design example, the definition of num_leading_pic_plus1 and nuh_temporal_id_plus1 are the same as described previously.

nuh_reserved_zero_3 bits shall be equal to '000'. Other values of nuh_reserved_zero_3 bits may be specified in the future by ITU-T|ISO/IEC. Decoders shall ignore (i.e. remove from the bitstream and discard) NAL units with values of nuh_reserved_zero_3 bits not equal to '000'.

nuh_reserved_zero_6 bits shall be equal to '000000'. Other values of nuh_reserved_zero_6 bits may be specified in the future by ITU-T|ISO/IEC. Decoders shall ignore (i.e. remove from the bitstream and discard) NAL units with values of nuh_reserved_zero_6 bits not equal to '000000'.

As shown in the above tables for NAL unit header and NAL unit header field data, the syntax design supports more types of random access picture. Furthermore, syntax nuh_field_present_flag is included in the NAL unit header. If nuh_field_present_flag is true, nuh_field_data( ) (i.e., NAL unit header field data) is signaled subsequently.

In the above embodiments, the NAL unit types is associated with coded slice to indicate the NUT of the coded slice, such as NON_IRAP, IRAP or GDR types. However, the present invention for signalling NUT is not limited to the coded slice. Other coded image areas can also be used. In the following examples, the coded image area corresponds to a coded tile group.

Design Example 4

An exemplary NAL unit header syntax and semantics are shown as follows:

| NAL unit header syntax | |
|---|---|
| nal_unit_header( ) { | Descriptor |
|   forbidden_zero_bit | f(1) |
|   nal_unit_type | u(5) |
|   end_nuh_field_flag | f(1) |
|   if(nal_unit_type == IRAP_NUT){ | |
|     random_access_type | f(2) |
|     num_leading_pic_plus1 | u(4) |
|     nuh_reserved_zero_3bits | u(3) |
|   } else if(nal_unit_type == GDR_NUT){ | |
|     refreshed_region_flag | f(1) |
|     gdr_pic_count | u(4) |
|     nuh_reserved_zero_4bits | u(4) |
|   } else { | |
|     nuh_temporal_id_plus1 | u(3) |
|     nuh_reserved_zero_6bits | u(6) |
|   } | |
| } | |

NAL Unit Header Semantics

In the above syntax example, forbidden_zero_bit shall be equal to 0. nal_unit_type specifies the type of RBSP data structure contained in the NAL unit as specified in the modified Table 7-1B, for design example 2, with the added nal_unit_type equal to 2 for GDR_NUT.

In the above syntax example, end_nuh_field_flag equal to 1 specifies that the subsequent bits shall be ignored, when nal_unit_type equal to IRAP_NUT, the content is coded slice of an instantaneous decoding refresh (IDR) picture; when nal_unit_type equal to non-IRAP_NUT, the content is coded slice segment of a dependent random access point (DRAP) picture. end_nuh_field_flag equal to 0 specifies that the subsequent bits shall be used for the NAL unit type.

random_access_type specifies the random access type associated with the NAL unit as specified in the modified Table 7-2B for design example 2.

In the above syntax example, num_leading_pic_plus1, refreshed_region_flag, gdr_pic_count and nuh_temporal_id_plus1 have the same definition as before.

nuh_reserved_zero_3 bits shall be equal to '000'. Other values of nuh_reserved_zero_3 bits may be specified in the future by ITU-T|ISO/IEC. Decoders shall ignore (i.e. remove from the bitstream and discard) NAL units with values of nuh_reserved_zero_3 bits not equal to '000'.

nuh_reserved_zero_4 bits shall be equal to '0000'. Other values of nuh_reserved_zero_4 bits may be specified in the future by ITU-T|ISO/IEC. Decoders shall ignore (i.e. remove from the bitstream and discard) NAL units with values of nuh_reserved_zero_4 bits not equal to '0000'.

nuh_reserved_zero_6 bits shall be equal to '000000'. Other values of nuh_reserved_zero_6 bits may be specified in the future by ITU-T|ISO/IEC. Decoders shall ignore (i.e. remove from the bitstream and discard) NAL units with values of nuh_reserved_zero_6 bits not equal to '000000'.

In some embodiments based on the design example 4, those reserved zero bits such as nuh_reserved_zero_4 bits may be specified for addition information, such as refreshed_region_flag, exact_match_flag and broken_link_flag as appropriate in HEVC.

In JVET-M1001 (("Versatile Video Coding (Draft 5)", in Joint Video Exploration Team (JVET) of ITU-T SG 16 WP 3 and ISO/IEC JTC 1/SC 29/WG 11, 13th Meeting, January 2019, Marrakesh, Morocco, Document: JVET-M1001), some NAL unit type codes and NAL unit type classes (RASL_NUT, RADL_NUT, IDR_NUT, CRA_NUT) are added in updated Table 7-1D from the last meeting as shown below.

TABLE 7-1D

NAL unit type codes and NAL unit type classes

| nal_unit_type | Name of nal_unit_type | Content of NAL unit and RBSP syntax structure | NAL unit type class |
|---|---|---|---|
| 0 | TRAIL_NUT | Coded tile group of a non-STSA trailing picture tile_group_layer_rbsp( ) | VCL |
| 1 | STSA_NUT | Coded tile group of an STSA picture tile_group_layer_rbsp( ) | VCL |
| 2 | RASL_NUT | Coded tile group of a RASL picture tile_group_layer_rbsp( ) | VCL |
| 3 | RADL_NUT | Coded tile group of a RADL picture tile_group_layer_rbsp( ) | VCL |
| 4 ... 7 | RSV_VCL_4. RSV_VCL_7 | Reserved non-IRAP VCL NAL unit types | VCL |
| 8<br>9 | IDR_W_RADL<br>IDR_N_LP | Coded tile group of an IDR picture tile_group_layer_rbsp( ) | VCL |
| 10 | CRA_NUT | Coded tile group of a CRA picture tile_group_layer_rbsp( ) | VCL |
| 11<br>12<br>13 | RSV_IRAP_VCL 11<br>RSV_IRAP_VCL 12<br>RSV_IRAP_VCL 13 | Reserved IRAP VCL NAL unit types | VCL |
| 14 ... 15 | RSV_VCL14 ... RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 ... 27 | RSV_NVCL24 ... RSV_NVCL27 | Reserved non-VCL NAL unit types | non-VCL |
| 28 ... 31 | UNSPEC28 ... UNSPEC31 | Unspecified non-VCL NAL unit types | non-VCL |

In the above table, a clean random access (CRA) picture may have associated RASL or RADL pictures present in the bitstream. An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

In MPEG based media file format (ISOBMFF) ("ISO based media file format", ISO/IEC 14496-12, W17277, February 2015), stream access points are specified in Annex I.

For each SAP the properties, ISAP, TSAP, ISAU, TDEC, TEPT, and TPTF are identified and defined as:

TSAP is the earliest presentation time of any access unit of the media stream such that all access units of the media stream with presentation time greater than or equal to TSAP can be correctly decoded using data in the Bitstream starting at ISAP and no data before ISAP.

ISAP is the greatest position in the Bitstream such that all access units of the media stream with presentation time greater than or equal to TSAP can be correctly decoded using Bitstream data starting at ISAP and no data before ISAP.

ISAU is the starting position in the Bitstream of the latest access unit in decoding order within the media stream such that all access units of the media stream with presentation time greater than or equal to TSAP can be correctly decoded using this latest access unit and access units following in decoding order and no access units earlier in decoding order.

NOTE ISAU is always greater than or equal to ISAP.

TDEC is the earliest presentation time of any access unit of the media stream that can be correctly decoded using data in the Bitstream starting at ISAU and no data before ISAU.

TEPT is the earliest presentation time of any access unit of the media stream starting at ISAU in the Bitstream.

TPTF is the presentation time of the first access unit of the media stream in decoding order in the Bitstream starting at ISAU.

Six types of SAPs are defined with properties as follows:
Type 1: $T_{EPT}=T_{DEC}=T_{SAP}=T_{PTF}$
Type 2: $T_{EPT}=T_{DEC}=T_{SAP}<T_{PTF}$
Type 3: $T_{EPT}<T_{DEC}=T_{SAP}<=T_{PTF}$
Type 4: $T_{EPT}<=T_{PTF}<T_{DEC}=T_{SAP}$
Type 5: $T_{EPT}=T_{DEC}<T_{SAP}$
Type 6: $T_{EPT}<T_{DEC}<T_{SAP}$ NOTE The type of SAP is dependent only on which Access Units are correctly decodable and their arrangement in presentation order. The types informally correspond with some common terms:

Type 1 corresponds to what is known in some coding schemes as a "Closed GoP random access point" (in which all access units, in decoding order, starting from $I_{SAP}$ can be correctly decoded, resulting in a continuous time sequence of correctly decoded access units with no gaps) and in addition the access unit in decoding order is also the first access unit in presentation order.

Type 2 corresponds to what is known in some coding schemes as a "Closed GoP random access point", for which the first access unit in decoding order in the media stream starting from $I_{SAU}$ is not the first access unit in presentation order.

Type 3 corresponds to what is known in some coding schemes as an "Open GoP random access point", in which there are some access units in decoding order following $I_{SAU}$ that cannot be correctly decoded and have presentation times less than $T_{SAP}$.

Type 4 corresponds to what is known in some coding schemes as an "Gradual Decoding Refresh (GDR) random access point", in which there are some access units in decoding order starting from and following $I_{SAU}$ that cannot be correctly decoded and have presentation times less than $T_{SAP}$.

Type 5 corresponds to the case for which there is at least one access unit in decoding order starting from $I_{SAP}$ that cannot be correctly decoded and has presentation time greater than $T_{DEC}$ and where $T_{DEC}$ is the earliest presentation time of any access unit starting from $I_{SAU}$.

Type 6 corresponds to the case for which there is at least one access unit in decoding order starting from $I_{SAP}$ that cannot be correctly decoded and has presentation time greater than $T_{DEC}$ and where $T_{DEC}$ is not the earliest presentation time of any access unit starting from $I_{SAU}$.

In HEVC, the recovery point SEI (Supplemental Enhancement Information) message assists a decoder in determining when the decoding process will produce acceptable pictures for display after the decoder initiates random access or after the encoder indicates a broken link in the CVS. When the decoding process is started with the access unit in decoding order associated with the recovery point SEI message, all decoded pictures at or subsequent to the recovery point in output order specified in this SEI message are indicated to be correct or approximately correct in content. Decoded pictures produced by random access at or before the picture associated with the recovery point SEI message need not be correct in content until the indicated recovery point, and the operation of the decoding process starting at the picture associated with the recovery point SEI message may contain references to pictures unavailable in the decoded picture buffer.

In HEVC, the region refresh information SEI message indicates whether the slice segments that the current SEI message applies to belong to a refreshed region of the current picture. An access unit that is not an IRAP access unit and that contains a recovery point SEI message is referred to as a gradual decoding refresh (GDR) access unit, and its corresponding picture is referred to as a GDR picture. The access unit corresponding to the indicated recovery point picture is referred to as the recovery point access unit.

In HEVC, the picture associated with a dependent random access point indication SEI message is referred to as a DRAP (dependent random access point) picture. The presence of the dependent random access point indication SEI message indicates the applied constraints on picture order and picture referencing. These constraints can enable a decoder to properly decode the DRAP picture and the pictures that follow it in both decoding order and output order without needing to decode any other pictures except the associated IRAP picture.

Based on the draft of JVET-M1001, the first three SAP types in ISOBMFF are addressed correspondingly with the picture properties of IDR, CRA, RADL, and RASL as in updated Table 7-1D as shown above. However, more types of pictures are desired per viewpoints of systems and applications, and specified as normative signaling instead of using various SEI messages as in HEVC.

In HEVC, the recovery point SEI message specifies the recovery point of decoded pictures in output order and the Region refresh information SEI message specifies the GDR pictures. These correspond to the SAP type 4 in ISOBMFF. A DRAP picture with the dependent random access point indication SEI message corresponds to a DRAP sample and the related DRAP sample grouping in ISOBMFF.

With the same motivation of adding IDR, CRA, RADL, and RASL that is higher level information in general and is friendly useful for a file writer and a system application. This invention proposes to add the NAL unit types of GDR_NUT and DRAP_NUT as in Table 7-1E below.

TABLE 7-1E

NAL unit type codes and NAL unit type classes.

| nal_unit_type | Name of nal_unit_type | Content of NAL unit and RBSP syntax structure | NAL unit type class |
|---|---|---|---|
| x1 | GDR_NUT | Coded tile group of a GDR picture tile_group_layer_rbsp( ) | VCL |
| x2 | DRAP_NUT | Coded tile group of a DRAP picture tile_group_layer_rbsp( ) | VCL |

Note
-A gradual decoding refresh (GDR) picture is not an IRAP picture, a CRA picture or an IDR picture. When the decoding process is started from a GDR access unit, the refreshed region in each GDR picture is indicated to be the region of the picture that is correct or approximately correct in content, and, when the last GDR picture is the recovery point picture, the refreshed region in the last GDR picture covers the entire picture.
Note
-A dependent random access point (DRAP) picture is a TRAIL_NUT picture. it contains no references to pictures other than its associated IRAP picture, CRA picture or IDR picture. Any picture that follows the DRAP picture in both decoding order and output order shall not contain references to any picture that precedes the DRAP picture in decoding order or output order with the exception of the IRAP picture, CRA piture, or the IDR picture associated with the DRAP picture.

The corresponding signaling is in the NAL unit header structure as below while keeping the header length of 16 bits.

| NAL unit header syntax | |
|---|---|
| nal_unit_header( ) { | Descriptor |
|   forbidden_zero_bit | f(1) |
|   nal_unit_type | u(5) |
|   if( nal_unit_type == DRAP_NUT ){ | |
|     drap_poc_cnt | u(7) |
|     nuh_reserved_zero_3bits | u(3) |
|   } else if ( nal_unit_type == GDR_NUT ){ | |
|     refreshed_region_flag | f(1) |
|     recovery_poc_cnt | u(6) |
|     nuh_reserved_zero_3bits | u(3) |
|   } else { | |
|     nuh_temporal_id_plus1 | u(3) |
|     nuh_reserved_zero_7bits | u(7) |
|   } | |
| } | |

Note
-When nal_unit_type equal to DRAP_NUT or GDR_NUT, nuh_temporal_id_plus1 is inferred to be 1. The multi-layer extensions can be for future consideration.

In the above syntax design, some new NAL unit header semantics are defined as follows.

refreshed_region_flag equal to 1 indicates that the tile group belong to the refreshed region in the current picture. refreshed_region_flag equal to 0 indicates that the tile group may not belong to the refreshed region in the current picture. The refreshed region in the last GDR picture covers the entire picture.

recovery_poc_cnt specifies the recovery point of decoded pictures in output order. The GDR picture with recovery_poc_cnt equal to 0 is the recovery point picture.

drap_poc_cnt specifies the DRAP picture position to its associated IRAP picture, CRA picture or IDR picture the in output order.

As some embodiments, those reserved zero bits in the NAL unit header structure may be specified for additional information as flags of exact_match_flag and broken_link_flag in HEVC.

Bitstream described in the foregoing embodiments can be stored in a non-transitory computer-readable medium. For example, the bitstream comprises data in a compressed format corresponding to a plurality of video frames, wherein the data comply with a syntax structure including a first syntax in NAL (Network Access Layer) unit header, wherein an NAL unit type indicated by the first syntax comprises a GDR (Gradual Decoding Refresh) picture type.

FIG. 1 illustrates an exemplary flowchart for an encoding device incorporating the syntax design according to an embodiment of the present invention, wherein the syntax structure includes a syntax in NAL (Network Access Layer) unit header and an NAL unit type indicated by the first syntax comprises the GDR picture type. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to the method, video data are received at an encoding device in step 110, where a GDR (Gradual Decoding Refresh) picture type is supported by the encoding device. A syntax structure including a first syntax in NAL (Network Access Layer) unit header is generated in step 120, where an NAL unit type indicated by the first syntax comprises the GDR picture type. Encoded video data comprising the syntax structure from the video data are generated in step 130.

The method can also be applied in a decoding device by performing corresponding reverse steps. For example, at the decoding side, encoded video data comprising a syntax structure are received, where a GDR (Gradual Decoding Refresh) picture type is supported in the encoded video data. A first syntax in NAL (Network Access Layer) unit header is parsed from the syntax structure, where an NAL unit type indicated by the first syntax comprises the GDR picture type. Decoded video data are generated from the encoded video data comprising the syntax structure.

The flowchart shown above is intended to illustrate examples of messaging between a server and a client for media streaming incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding, the method comprising:
receiving video data at an encoding device, wherein a GDR (Gradual Decoding Refresh) picture type is supported by the encoding device;
generating a syntax structure including
a first syntax in an NAL (Network Access Layer) unit header of an NAL unit, the first syntax indicating an NAL unit type selected from a group of types including the GDR picture type,
a second syntax in the NAL unit header, the second syntax indicating whether a set of NAL unit header field data is included in the NAL unit header, and
in a case that the first syntax indicates the GDR picture type and the second syntax indicates that the set of NAL unit header field data is included in the NAL unit header, a refreshed region flag included in the set of NAL unit header field data, the refreshed region flag indicating whether a corresponding coded image area contained in the NAL unit belongs to a refreshed region in a current picture; and
generating encoded video data arranged in the NAL unit according to the syntax structure and the video data.

2. The method of claim 1, wherein, in the case that the first syntax indicates the GDR picture type and the second syntax indicates that the set of NAL unit header field data is included in the NAL unit header, the syntax structure further includes GDR related data included in the set of NAL unit header field data the GDR related data including the refreshed region flag.

3. The method of claim 2, wherein the coded image area corresponds to a coded tile group.

4. The method of claim 2, wherein the coded image area corresponds to a coded slice.

5. The method of claim 2, wherein the GDR related data comprise a GDR picture count syntax to indicate a number of current and subsequent coded GDR pictures preceding a recovery point in an output order.

6. The method of claim 2, wherein the GDR related data comprise a recovery picture count to specify a recovery point of decoded pictures in an output order.

7. The method of claim 1, wherein the group of types comprises a DRAP (Dependent Random Access Point) picture type.

8. The method of claim 1, wherein the group of types type comprises an IRAP (Intra Random Access Point) picture type.

9. An apparatus for video encoding, the apparatus comprises one or more electronic circuits or processors configured to:
- receive video data at an encoding device, wherein a GDR (Gradual Decoding Refresh) picture type is supported by the apparatus;
- generate a syntax structure including
  - a first syntax in an NAL (Network Access Layer) unit header of an NAL unit, the first syntax indicating an NAL unit type selected from a group of types including the GDR picture type,
  - a second syntax in the NAL unit header, the second syntax indicating whether a set of NAL unit header field data is included in the NAL unit header, and
  - in a case that the first syntax indicates the GDR picture type and the second syntax indicates that the set of NAL unit header field data is included in the NAL unit header, a refreshed region flag included in the set of NAL unit header field data, the refreshed region flag indicating whether a corresponding coded image area contained in the NAL unit belongs to a refreshed region in a current picture; and
- generate encoded video data arranged in the NAL unit according to the syntax structure and the video data.

10. The apparatus of claim 9, wherein the set of NAL unit header field data includes a GDR picture count syntax indicating a number of current and subsequent coded GDR pictures preceding a recovery point in an output order.

11. A method of video decoding, the method comprising:
- receiving, by a decoding device, encoded video data arranged in an NAL (Network Access Layer) unit according to a syntax structure, wherein a GDR (Gradual Decoding Refresh) picture type is supported by the decoding device;
- parsing the syntax structure to obtain
  - a first syntax in an NAL unit header of the NAL unit, the first syntax indicating an NAL unit type selected from a group of types including the GDR picture type,
  - a second syntax in the NAL unit header, the second syntax indicating whether a set of NAL unit header field data is included in the NAL unit header, and
  - in a case that the first syntax indicates the GDR picture type and the second syntax indicates that the set of NAL unit header field data is included in the NAL unit header, a refreshed region flag included in the set of NAL unit header field data, the refreshed region flag indicating whether a corresponding coded image area contained in the NAL unit belongs to a refreshed region in a current picture; and
- generating decoded video data from the encoded video data according to one or more of the first syntax, the second first syntax, and the refreshed region flag.

12. The method of claim 11, wherein, in the case that the first syntax indicates the GDR picture type and the second syntax indicates that the set of NAL unit header field data is included in the NAL unit header, the syntax structure further includes GDR related data included in the set of NAL unit header field data, the GDR related data including the refreshed region flag.

13. The method of claim 12, wherein the coded image area corresponds to a coded tile group.

14. The method of claim 12, wherein the coded image area corresponds to a coded slice.

15. The method of claim 12, wherein the GDR related data comprise a GDR picture count syntax to indicate a number of current and subsequent coded GDR pictures preceding a recovery point in an output order.

16. The method of claim 12, wherein the GDR related data comprise a recovery picture count to specify a recovery point of decoded pictures in an output order.

17. The method of claim 11, wherein the group of types comprises a DRAP (Dependent Random Access Point) picture type.

18. The method of claim 11, wherein the group of types comprises an IRAP (Intra Random Access Point) picture type.

19. An apparatus for video decoding, the apparatus comprises one or more electronic circuits or processors configured to:
- receive encoded video data arranged in an NAL (Network Access Layer) unit according to a syntax structure, wherein a GDR (Gradual Decoding Refresh) picture type is supported by the apparatus;
- parse the syntax structure to obtain
  - a first syntax in an NAL unit header of the NAL unit, the first syntax indicating an NAL unit type selected from a group of types including the GDR picture type,
  - a second syntax in the NAL unit header, the second syntax indicating whether a set of NAL unit header field data is included in the NAL unit header, and
  - in a case that the first syntax indicates the GDR picture type and the second syntax indicates that the set of NAL unit header field data is included in the NAL unit header, a refreshed region flag included in the set of NAL unit header field data, the refreshed region flag indicating whether a corresponding coded image area contained in the NAL unit belongs to a refreshed region in a current picture; and
- generate decoded video data from the encoded video data according to one or more of the first syntax, the second first syntax, and the refreshed region flag.

20. The apparatus of claim 19, wherein the set of NAL unit header field data includes a GDR picture count syntax to indicating a number of current and subsequent coded GDR pictures preceding a recovery point in an output order.

21. A non-transitory computer-readable medium storing program codes which when executed by one or more processors cause the one or more processors to perform a decoding process, and the decoding process comprising:
- receiving encoded video data arranged in an NAL (Network Access Layer) unit according to a syntax structure, wherein a GDR (Gradual Decoding Refresh) picture type is supported by the decoding process;
- parsing the syntax structure to obtain
  - a first syntax in an NAL unit header of the NAL unit, the first syntax indicating an NAL unit type selected from a group of types including the GDR picture type,
  - a second syntax in the NAL unit header, the second syntax indicating whether a set of NAL unit header field data is included in the NAL unit header, and
  - in a case that the first syntax indicates the GDR picture type and the second syntax indicates that the set of NAL unit header field data is included in the NAL unit header, a refreshed region flag included in the set of NAL unit header field data, the refreshed region flag indicating whether a corresponding coded image area contained in the NAL unit belongs to a refreshed region in a current picture; and generating decoded video data from the encoded video data according to one or more of the first syntax, the second first syntax, and the refreshed region flag.

\* \* \* \* \*